United States Patent [19]

Hoag

[11] Patent Number: 4,578,792
[45] Date of Patent: Mar. 25, 1986

[54] HIGH-POWER LASERS
[75] Inventor: Ethan D. Hoag, East Boston, Mass.
[73] Assignee: Metalworking Lasers International Ltd., Neve Sharett, Israel
[21] Appl. No.: 431,014
[22] Filed: Sep. 30, 1982
[51] Int. Cl.$^4$ ............................................... H01S 3/22
[52] U.S. Cl. ........................................ 372/58; 372/65; 372/93; 372/55
[58] Field of Search ...................... 372/58, 93, 92, 55, 372/29, 31, 108, 700, 107, 65

[56] References Cited
U.S. PATENT DOCUMENTS
4,486,887 12/1984 Hoag et al. ............................. 372/93

Primary Examiner—William L. Sikes
Assistant Examiner—Léon Scott, Jr.
Attorney, Agent, or Firm—Benjamin J. Barish

[57] ABSTRACT

A high-power flowing-gas laser comprises an outer housing, an optical system including a laser channel within the housing, an impeller driven by a motor for producing a flow of gas through the laser channel, and an independent mounting for mounting the optical system to the support idependently of the housing mounting such as to isolate the optical system from the vibrational disturbances of the impeller and its motor drive. The laser channel is folded so as to be constituted of a plurality of laser channel legs disposed in a polygon configuration, there being a gas flow channel for each laser channel leg and a conduit arrangement directing the gas to flow transversely across the legs radially inwardly from the outer region of the polygon to a common collection region within the polygon. A first heat-exchanger is provided between the common collection region and the impeller for cooling the gas, and a second heat-exchanger is provided in a fixed annular array of turning vanes between the outlet end of the impeller and the inlet ends of the gas flow channels for further cooling the gas.

20 Claims, 7 Drawing Figures

HIGH-POWER LASERS

The present application is related to pending application Ser. No. 410,594 filed Aug. 23, 1982 by Ethan D. Hoag and Glen W. Zeiders now U.S. Pat. No. 4,486,887, Ser. No. 431,254 filed Sept. 30, 1982 by Ethan D. Hoag Ser. No. 431,252 filed Sept. 30, 1982 by Jacob Daniel, and Ser. No. 431,253 filed Sept. 30, 1982 by David Katz all assigned to the same assignee as the present application.

BACKGROUND OF THE INVENTION

The present invention relates to lasers, and particularly to high-power flowing-gas lasers.

There has been considerable activity in recent years to produce high-power flowing-gas lasers for use particularly in the metalworking industries. Examples of some of the known lasers of this type are described in U.S. Pat. Nos. 3,641,457; 3,702,973; 3,886,481; 4,058,778; 4,317,090 and 4,321,558. One of the main problems in the design of such high-power lasers is the dissipation of the heat, since power lasers cannot operate efficiently at unduly high temperatures. For example, the $CO_2$ laser, which is the one mainly used today for high power applications, cannot operate efficiently at temperatures much above 200° C. While the heat dissipation, and therefore the power output, can both be increased by increasing the length of the laser channel, this entails a considerable increase in the size and cost of the laser.

One object of the present invention, therefore, is to provide a novel high-power flowing-gas laser which maximizes the length of the laser channel and of the power output capability of the laser for a given system size.

Another problem involved in the high-power flowing-gas lasers is optical distortion in the outputted beam arising from a number of causes. One is phase distortion due to a density gradient in the flowing gas and amplitude variation due to a gain gradient in the flowing gas both of which are described in the above-cited co-pending application Ser. No. 410,594 filed Aug, 23, 1982 now U.S. Pat. No. 4,486,887 and substantially reduced or eliminated by the systems described therein. I have found, however, that optical distortion is also caused by mechanical vibrational disturbances imparted to the optical system by the impeller and motor drive which produces the gas flow through the laser channel.

Accordingly, another object of the present invention is to provide a high-power flowing-gas laser which substantially reduces the latter optical distortion in the outputted laser beam.

SUMMARY OF THE INVENTION

According to one aspect of the present invention, there is provided a high-power flowing-gas laser comprising: a housing having a sealed wall capable of withstanding an internal pressure different from atmospheric; a housing mounting for mounting the housing to a support; an optical system including a laser channel within the housing; an impeller within the housing for producing a flow of gas through the laser channel; and a motor drive for driving the impeller. The laser further includes an independent mounting for mounting the optical system to the support independently of the housing mounting such as to isolate the optical system from the vibrational disturbances of the impeller and motor drive. The housing further includes a sealed lead-through leading the independent mounting of the optical system through the housing wall in a sealed manner. The independent mounting for the optical system includes a plurality of legs each having a sealed lead-through leading the respective leg through the housing wall. In addition, the sealed lead-through for each leg comprises an elastomeric boot between the respective leg and the housing wall. The outer face of each boot is disposed within the interior of the housing, which is subject to a sub-atmospheric pressure. The inner face of each boot being disposed exteriorly of the housing is subject to atmospheric pressure thereby preventing the boot from buckling.

In the preferred embodiment of the invention described below, the independent mounting for the optical system includes a plurality of legs (four in the described embodiment) including a sealed lead-through for each leg leading the respective leg through the housing wall. Also, all the independent mounting legs are mounted at their lower ends to a common heavy base plate.

Further, in the described preferred embodiment the optical system includes a folded laser channel constituted of a plurality of legs disposed in a polygon configuration. There are four legs arranged in a square configuration in the described embodiment. Each leg is provided with a gas flow channel having aligned laser openings at the opposite sides for accomodating the laser beam of the respective channel leg. The laser further includes conduit means directing the gas to flow transversely across the laser channel legs radially inwardly from the outer region of the polygon to a common collection region within the polygon. A heat-exchanger is disposed between the common collection region and the impeller so as to extract heat from the hot gas just before it enters the impeller. Such an arrangement maximizes the laser channel length, and also the dissipation of the heat, for a given system size and volume.

According to another feature in the described preferred embodiments, the drive motor is mounted directly to the housing wall. Such an arrangement obviates the need for a rotary seal for leading the drive shaft through the housing wall.

According to a still further feature in a preferred embodiment of the invention described below, the laser may include a fixed annular array of turning vanes between the outlet end of the impeller and the inlet end of the gas flow channels. These vanes are oriented to turn the gas flow from an azimuthal direction as it leaves the impeller to an axial direction as it enters the inlet ends of the gas flow channels. The turning vanes are designed so that the space between each pair of vanes forms a slowly diverging channel which acts as a diffuser (well known in the aerodynamic art) which reduces the flow velocity thus recovering some of its dynamic pressure in the form of static pressure. The fixed annular array of turning vanes also acts as a heat-exchanger for extracting additional heat from the gas before it enters the gas flow channels. This arrangement permits the bulk of the heat to be extracted from the hot gas by low-cost means, such as by circulating cooling water at ambient temperature through the main heat exchanger, before the gas enters the impeller, and then permits the gas temperature to be further decreased to the optimum value, by higher-cost cooling means, such as chilled water, by the turning vanes.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
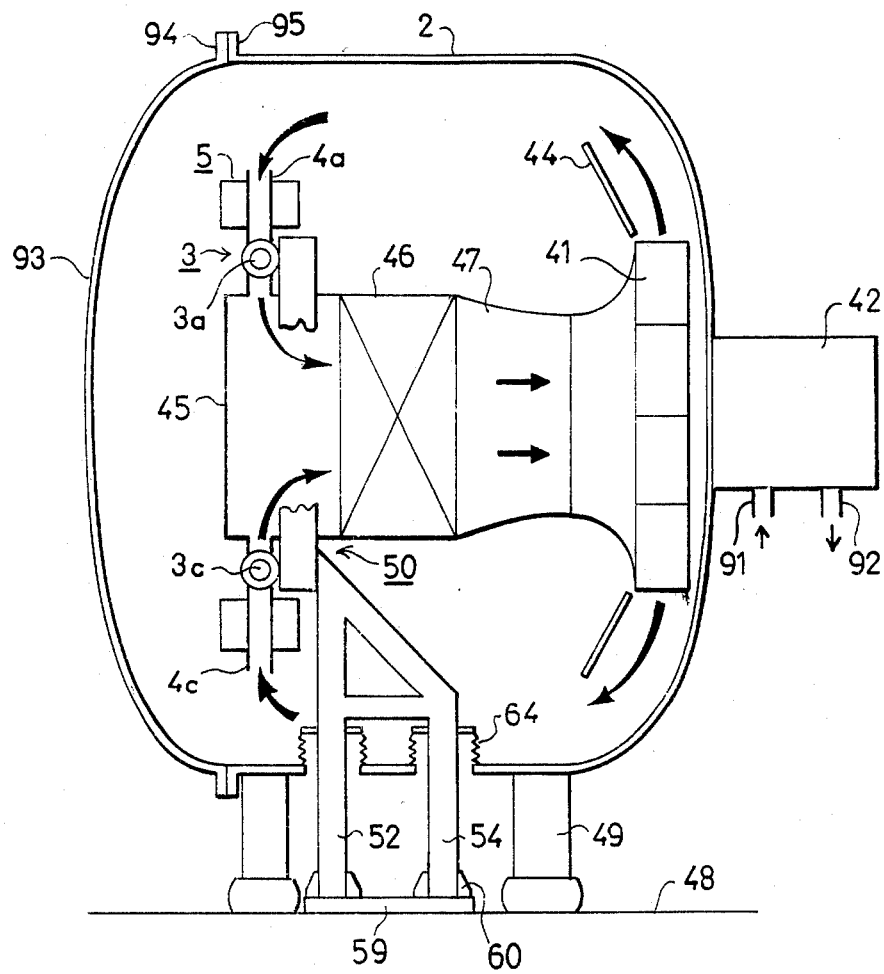
FIG. 1 is a side elevation view schematically illustrating one form of laser constructed in accordance with the present invention.

With reference first to FIG. 1, there is illustrated a high-power flowing-gas laser including an outer housing 2 capable of withstanding an internal pressure which is different from atmospheric. In this type of laser, the pressure is below about 0.2 atmospheres. The preferred pressure for the arrangement illustrated, particularly for the type of electric discharge to be used for exciting the laser gas, is about 0.05 atmospheres. The gas is preferably one of the known $CO_2$ mixtures commonly used in high-power lasers.

The laser channel in which lasing occurs is in the form of a folded optical cavity or resonator, generally designated 3, and more particularly describe in copending U.S. Pat. application Ser. No. 410,594, filed Aug, 23, 1982. As shown particularly in FIG. 2 the optical cavity or resonator 3 is folded so as to be constituted of four legs 3a—3d arranged in a square configuration. These four legs are defined by a primary mirror 31 at one end, a feedback mirror 32 at the opposite end, and three folding mirrors 33, 34, and 35, each disposed between a pair of adjacent legs and oriented 450° to the beam, to thereby reflect the rays from one leg to the next. The output mirror 36 is a scraper mirror just in front of feedback mirror 32, and removes a portion of the laser rays reflected within the four-leg optical cavity and deflects same through an output window 37, such as a ZnSe window, to produce the output laser beam.

Figure 3:
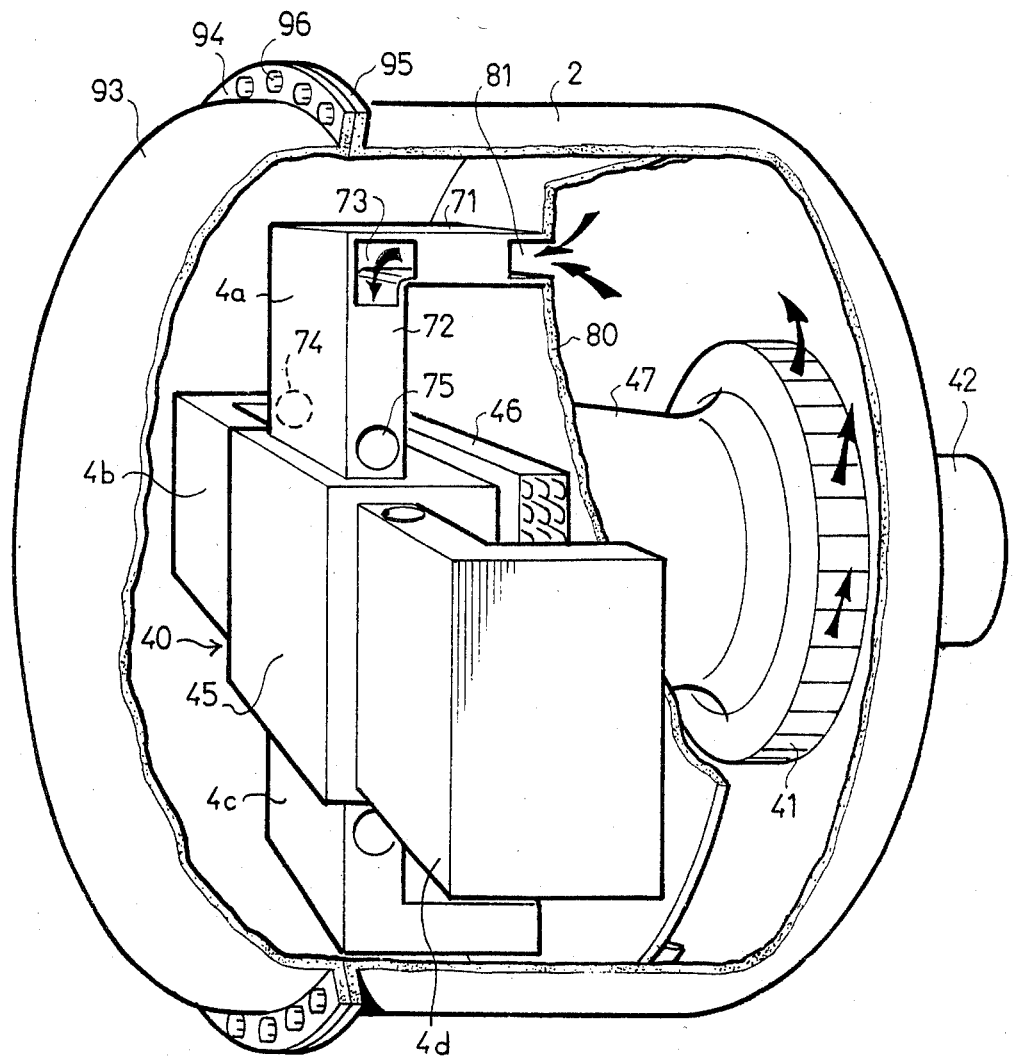
FIG. 3 is a three-dimensional view, partly broken away, particularly illustrating the gas flow path in the laser of FIGS. 1 and 2.

The illustrated laser includes a conduit system, generally designated 40 and best seen in FIG.3, for producing a flow of the laser gas transversely across each of the legs 3a—3d of the folded laser channel. Each laser channel leg is served by a separate gas flow channel 4a-4d, respectively, through which a gas flow is produced by means of an impeller 41 driven by an electric motor 42 (e.g. FIG. 1), the output end of impeller 41 being equipped with a diffuser 44.

The gas flowing via the flow channels 4a-4d, flows transversely through the respective legs 3a-3d of the folded laser channel, but first the gas is excited by an electrical discharge system, generally designated 5 in FIG. 1, provided at the upstream side of each laser channel leg. Various types of electrical discharge systems are known and could be used, e.g., one including an external ionization source, such as an electron beam. However, in the present case it is preferred to use a high frequency electrical discharge system including segmented electrodes and ballasting, such as shown in copending patent application Ser. No. 431,253, filed Sept. 30, 1982.

The gas flowing through the gas channels 4a-4d is subjected to an increase in temperature as the gas flows transversely across the respective legs 3a-3d of the laser optical cavity 3, so that the gas exiting from channels 4a-4d is at a substantially higher temperature than the gas entering them. The heated gas is directed by conduit means including a wall 45 (FIGS. 1 and 3) to flow through a heat exchanger 46, and then via a conduit 47 to the input of impeller 41 for recirculation through the gas flow channels 4a-4d.

As briefly described above, and more particularly in copending patent application Ser. No. 410,594 filed Aug. 23, 1982 folding the laser optical cavity 3 so as to be constituted of four legs 3a—3d arranged in a square configuration in a common plane, with a folding mirror 33, 34, 35 between each pair of legs, provides a number of important advantages. Thus, the folding mirrors are disposed so that the laser rays are alternately transposed from the upstream (or downstream) side of one leg to the downstream (or upstream) side of the next adjacent leg, with respect to the gas flowing transversely across the legs. Such an arrangement provides compensation for phase distortion due to the density gradient, and also compensation for amplitude variations due to the gain gradient in the gas flowing transversely across the legs, which is apparent by tracing the path of the extreme rays $R_1$ and $R_2$ (FIG. 2) through all four of the laser channel legs 3a-3d, starting from the primary mirror 31 to the feedback mirror 32. Thus, ray $R_1$ is on the upstream side of the gas flow channel 4a for laser leg 3a, and ray $R_2$ is on the downstream side in laser channel leg 3a; but both are transposed by the first folding mirror 33 between laser channel legs 3a and 3b so that in leg 3b ray $R_1$ appears on the downstream side of the flow channel, and ray $R_2$ appears on the upstream side. A similar transposition is produced by folding mirror 34, which returns ray $R_1$ to the upstream side and ray $R_2$ to the downstream side in leg 3c; and another transposition is effected by folding mirror 35 which again reflects ray $R_1$ to the downstream side and ray $R_2$ to the upstream side in leg 3d. Thus, any phase distortion due to the density gradient (inverse to the temperature gradient) in one leg will be compensated for in the next adjacent leg; and similarly any amplitude variations due to the gain gradient in one leg will also be compensated for by the transposition in the next adjacent leg. Maximum compensation is produced by providing an even number of legs in the laser channel so that the variations in one leg cancel those in the next, and by providing a separate flowing gas channel for each of the laser channel legs so that the gas flow is in parallel, rather than in series, across the respective legs. A further description of this aspect of the illustrated laser system is set forth in the above-cited copending patent application Ser. No. 410,594 filed Aug. 23, 1982.

Figure 4:
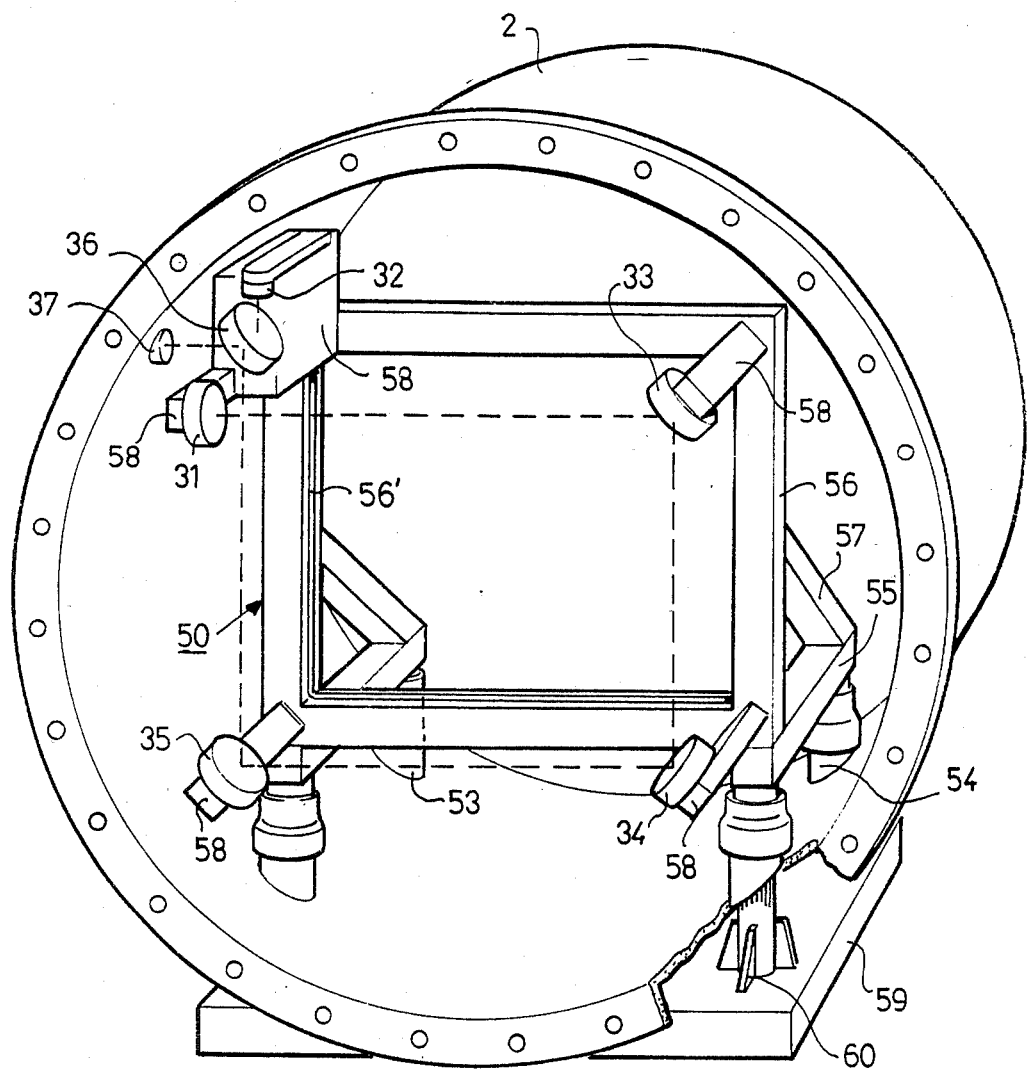
FIG. 4 is another three-dimensional view, partly broken way and taken from an end of the laser, to show particularly the independent mounting for optical system of the laser.

According to an important feature of the present invention, the mirrors comprising the optical system 3 are supported on an independent mounting, generally designated 50 in FIGS. 1 and 4, which is separate and apart from the housing mounting, generally designated 49 in FIG. 1, such as to isolate the optical system from the vibrational disturbances produced by the impeller 41 and the motor drive 42. Briefly, this independent mounting 50 includes a temperature-stabilized mild steel frame supported on legs each of which protrudes out of the vacuum chamber in housing 2 through a flexible lead-through, such as an elastomeric boot or a metal bellows, to a heavy base beneath the chamber. The chamber, including the impeller and its drive, is isolated from the factory floor 48 (FIG. 1) by vibrational isolator mounts. This arrangement isolates the optical components from the major vibration source, (namely, the impeller and its drive), while allowing the laser beam source, (i.e., the optical resonator) to be positively referenced to the factory floor.

More particularly, and as shown in FIGS. 1 and 4, independent mounting 50 includes four legs 51-54 secured to the four corners of a horizontal frame member 55 of open rectangular configuration. The independent mounting 50 further includes a vertical rectangular frame 56, and a pair of inclined frame members 57 secured between the rear end of the horizontal frame member 55 and the upper end of the vertical frame member 56. The latter includes water-cooling conduits 56' to stabilize the temperature of the frame.

The mirrors of the optical system, namely the primary mirror 31, feedback mirror 32, the three folding mirrors 33-35, and the scraper mirror 36, are all carried by brackets 58 (FIG. 4) mounting them in cantilever fashion to the four corners of the vertical frame member 56.

Each of the optical system mounting legs 51-54 passes through the housing wall 2 in a sealed manner, and all are supported on a common heavy metal base 59 externally of the chamber. For stabilization purposes, the lower ends of the legs are provided with radially-extending webs 60.

Figure 5:
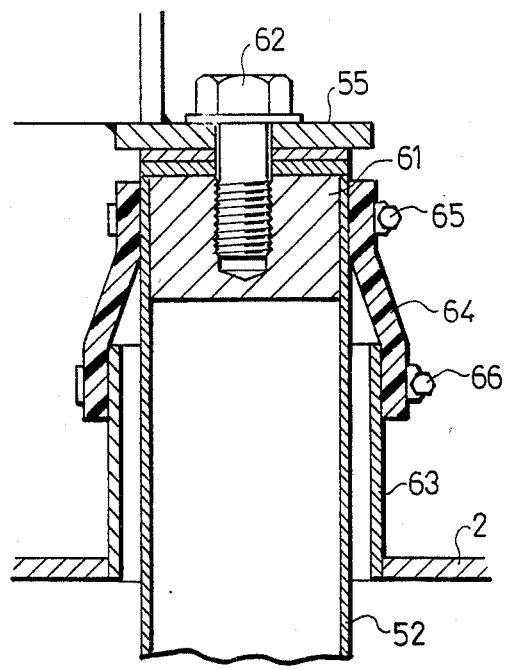
FIG. 5 is an enlarged sectional view illustrating the sealed-through arrangement for one of the legs of the independent mounting for the optical system.

The sealed lead-through mounting for each of the legs 51-54 is shown in detail in FIG. 5 with respect to leg 52. Thus, each leg is hollow but is reinforced at its upper end by a block 61 and is secured to the respective corner of the horizontal frame member 55 by a bolt 62 passing through this block. Each corner of the housing wall 2 is provided with a tubular sleeve 63 coaxial with, but of larger diameter than, the respective leg 52. An elastomeric boot (or a metal bellows) 64 is secured at its upper end by a clamp 65 to the upper end of leg 52, and at its lower end by another clamp 66 to the upper end of housing sleeve 63.

It will thus be seen that the outer face of each boot (or bellows) 64 is disposed within the interior of housing 2, which interior is subjected to a sub-atmospheric pressure; and that is inner face of each boot is disposed exteriorly of the housing and is therefore subject to atmospheric pressure. There will therefore always be a pressure difference acting radially outwardly on each boot, preventing the boot from buckling, while at the same time the boot isolates the horizontal frame 55, together with the remainder of the optical system supported thereby, from the vibrational disturbances to which the housing is subjected by the impeller 41 and its motor drive 42.

In the illustrated laser, the gas I/conduit system 40 confines substantially all the gas to flow through a path transversely across each of the channel legs 3a–3d. As described in copending patent application Ser. No. 410,594 filed Aug. 23, 1982, such an arrangement reduces optical disturbances; but in addition, and as described below, it also reduces other disturbances affecting the stability of the electric discharge producing the population inversion in the laser gas, besides providing other important advantages.

Figure 2:
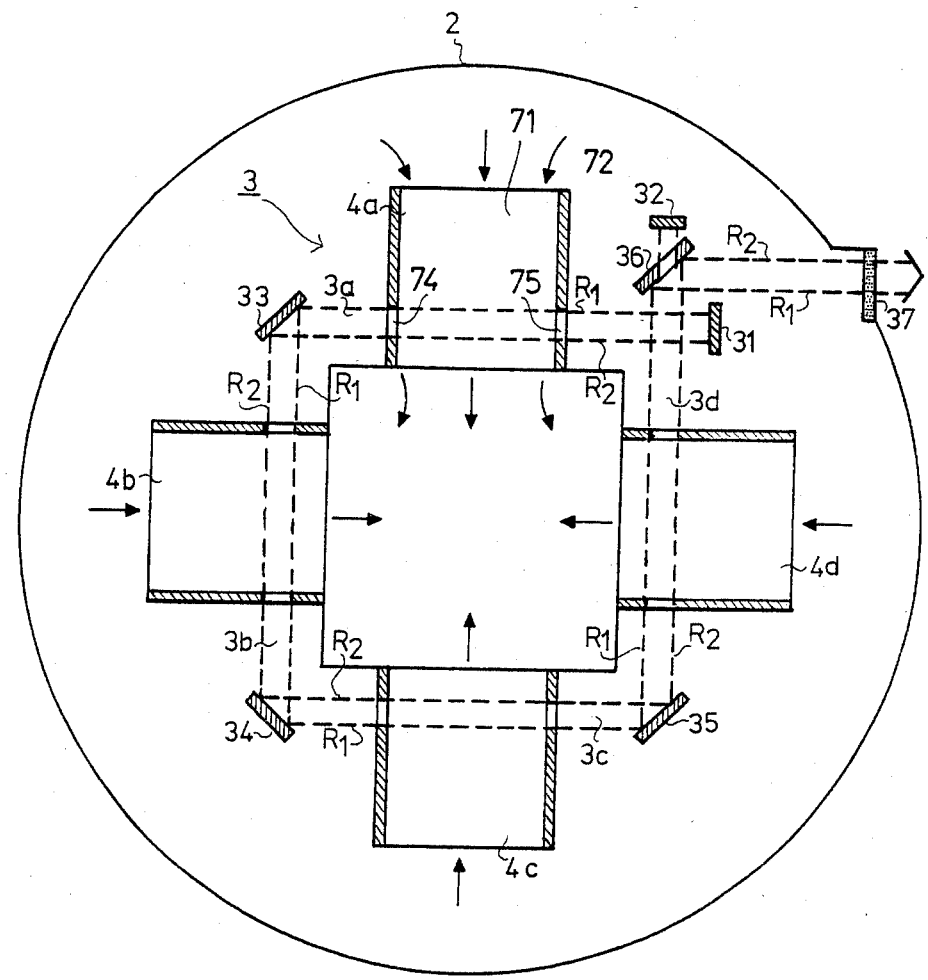
FIG. 2 is a view, transverse to that of FIG. 1, schematically showing the folded laser channel of the optical system and the flowing gas channels for conducting the gas flow transversely through the laser channel legs.

Thus, as shown particularly in FIGS. 2 and 3, each of the gas channel legs 4a–4d includes (for leg 4a) an axially-extending inlet section 71, a radially-extending section 72, and baffles 73 fixed at the juncture of the two sections to direct the gas flow from the axial section to the radial section. The electrical discharge system (generally designated 5 in FIG. 1 as noted above) is disposed at the upper end of the respective radially-extending section 72 of each channel. The lower end of each of the radially-extending sections is provided with the pair of openings, 74, 75, aligned with each other and with the respective mirrors of the folded optical system, e.g., mirrors 31 and 33 for laser leg 3a.

As shown particularly in FIG. 3, the laser further includes an internal partition wall or bulkhead 80 between the impeller 41 and the heat-exchanger 46. Impeller 80 is secured at its outer end to the inner face of housing 2. It is provided with four outer openings 81, one for accomodating the inlet end of the axially-extending section (e.g. 71) of each of the four gas channels 4a–4d. It is also provided with a central opening for accomodating the conduit 47 between the heat-exchanger 46 and the impeller 41.

It will thus be seen that the internal partition wall 80 confines the gas flow from the impeller 41 and its diffuser 44 to the inlet sections (e.g., 71) of the four gas flow channels 4a–4d, whereupon the gas is conducted by the axially-extending sections and then by the radially-extending sections (e.g., 72), to flow transversely across the laser channel legs 3a–3d at the lower ends of the gas flow channels. As indicated earlier, the laser gas is excited by the electrical discharge system (5 in FIG. 1) at the upper end of each of the radially-extending sections, and gives up this energy to the laser beam or mode passing through the aligned openings (e.g., 74, 75) at the lower ends. As also indicated earlier, the gas is heated during its traverse of the respective channel section, so that the gas exiting from the gas flow channels 4a–4d is at a higher temperature than that entering them. This heated gas leaves the gas flow channels 4a–4d in the central common collection region and is then directed by wall 45 to the heat-exchanger 46, and then via conduit 47 passing through the internal partition wall 80 to the impeller 42 for recirculation back through the gas flow channels 4a–4d.

The foregoing arrangement substantially confines all the gas to enter the four gas channels 4a–4d via their respective inlet sections (e.g., 71), with substantially no gas entering the gas channels via the laser openings (e.g., 74, 75 for leg 4a). This has been found to produce a number of advantages besides those described in the above-cited corresponding patent application Ser. No. 410,594 filed Aug, 23, 1982. Thus, in addition to significantly reducing the optical disturbances heretofore caused by gas flow through the openings accomodating the laser beam or mode, it has been found also to significantly reduce the instability in the electrical discharge produced by the gas flow through the openings in accomodating the laser beam or mode. In addition, since substantially all the gas thus circulated passes through the electrical field which produces the population inversion, the described arrangement significantly increases the overall efficiency of the laser, as compared to one wherein there is significant gas flow through the openings in the gas flow channel accomodating the laser beam or mode. Still further, the novel arrangement makes efficient use of the inward radial flow of the gas for maximizing the cooling for a given system volume.

Figure 6:
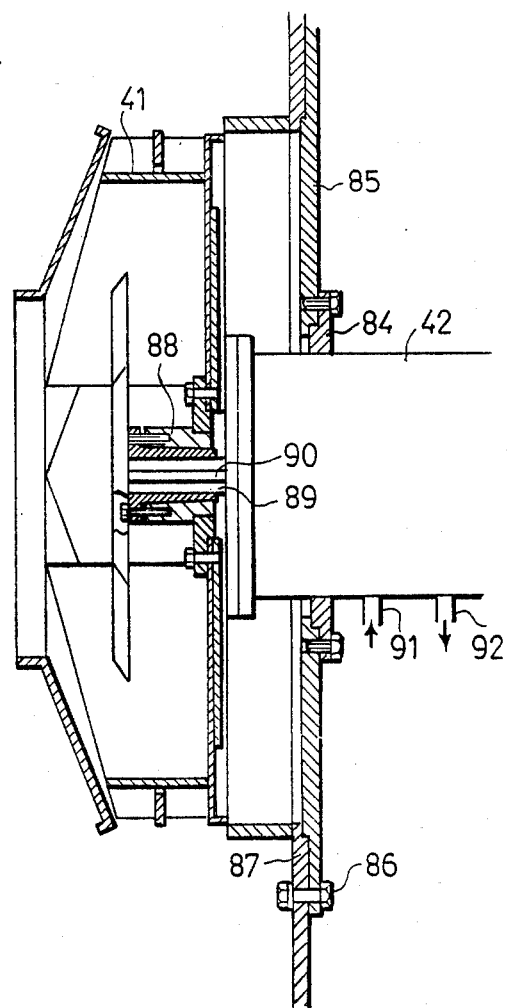
FIG. 6 is a sectional view illustrating the mounting of the impeller motor.

According to another important feature in the described preferred embodiment, the drive motor 42 for the impeller 41 is directly mounted to the housing wall, with the drive shaft of the motor disposed within the housing and coupled to the impeller 41 within the housing. This is more particularly illustrated in FIG. 6, where it will be seen that motor 42 is secured within a mounting plate 84 fastened to a flange 85 removably attached, by fasteners 86, to the end wall 87 of the housing 2. The housing end wall 87 carries the rotary impeller 41, the latter including a rotary shaft 88 which is coupled to the drive motor shaft 89 when the drive motor 42 is attached to the housing. The drive motor shaft 89 is provided with a keying rib 90 received within a corresponding keying slot on the rotary shaft 88 of the impeller 41, in order to couple the drive motor shaft 89 to the rotary impeller shaft 88 while at the same time permitting axial displacement of the drive motor shaft with respect to the impeller shaft. Motor 42 is cooled by water inletted at 91 and outletted at 92.

The foregoing arrangement, by providing a relatively short direct coupling between the drive shaft of the motor 42 and the impeller 41, further reduces the vibrational disturbances imparted by the drive motor to the optical system of the laser. In addition, it simplifies the manner of coupling the motor to the impeller. Further, by mounting the motor 42 to a flange 85 removable from one end wall 87 of the housing 2, a convenient access opening is provided into the interior of the laser housing for purposes of maintenance or repair.

Preferably, the end wall 93 (FIG. 3) at the opposite end of the housing 2 is also conveniently removable in order to provide another access via the opposite side of the laser housing. For this purpose, end wall 93 is formed with an annular flange 94 removably attachable to annular flange 95 of the housing 2 by means of fasteners 96.

Figure 7:
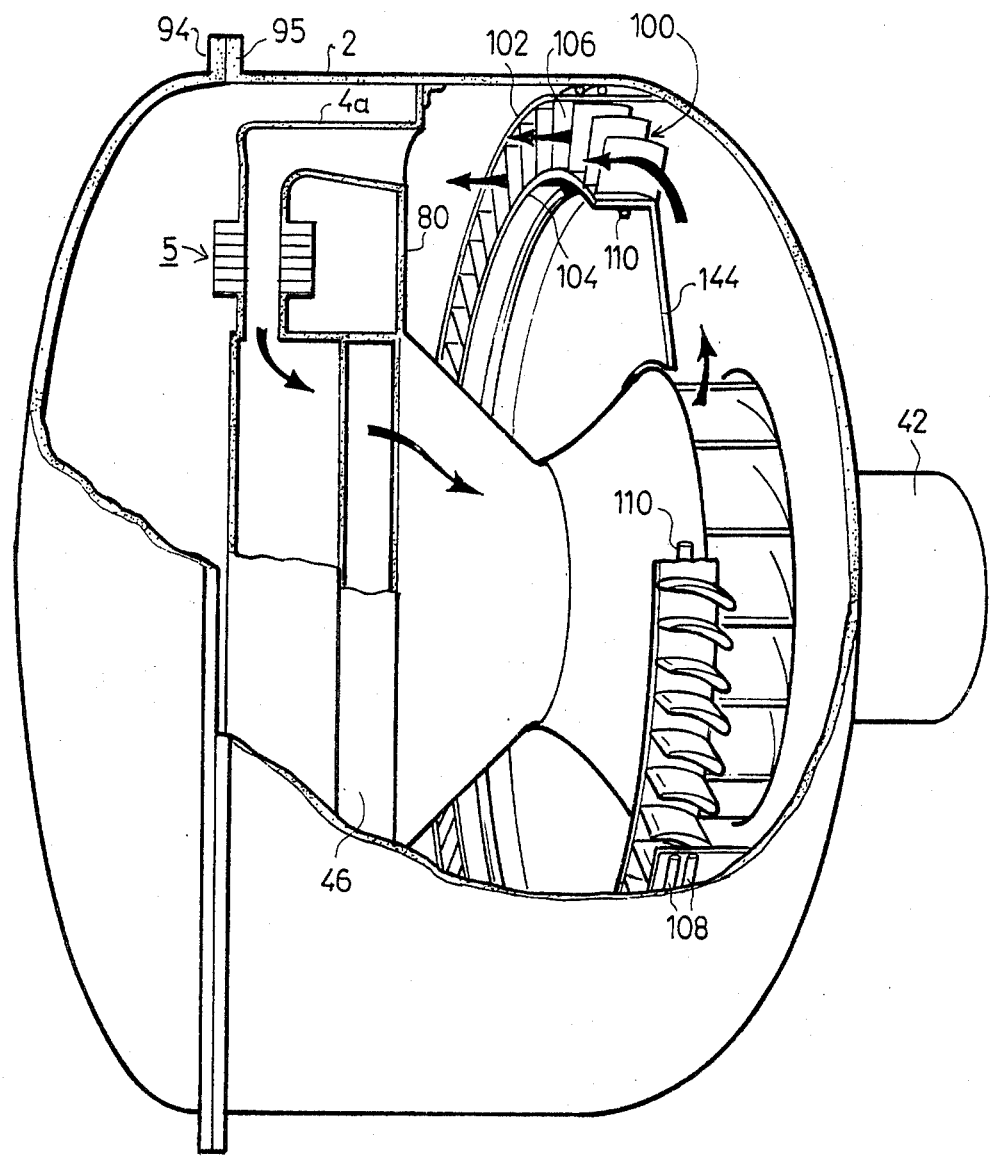
FIG. 7 is a view, partly borken away, to show the inclusion of a fixed annular array of turning vanes between the outlet end of the impeller and the inlet ends of the gas flow channels in the illustrated laser.

FIG. 7 illustrates a further feature preferably included in the described laser system, namely the provision of a fixed annular array of turning vanes, generally designated 100, between the outlet end of the impeller 41 and the inlet ends of the gas flow channels 4a–4d. The provision of such an array of turning vanes deflects the gas from a radial direction as it leaves the impeller 41, to an axial direction as it enters the inlet ends of the gas flow channels. These turning vanes are also exploited to act as a multi-channel diffuser to reduce the gas velocity and recover its dynamic pressure, and to extract further heat from the gas before it enters the gas flow channels 4a–4d, in order to cool the gas to the optimum temperature of operation of the laser system.

Thus, as shown in FIG. 7, the turning vanes assembly 100 comprises two annular rings 102 and 104, carrying between them a plurality of turning vanes 106 oriented to turn the gas flow from the azimuthal direction to the axial direction as described above. The complete assembly is secured to the inner face of the housing 2 between the impeller 41 and the internal partition plate 80. In addition, water-conducting tubes 108 are carried along the outer face of the outer ring 102, between it and the inner face of the housing 2, and also along the inner face of the inner ring 104. A cooling liquid, such as chilled water, is circulated through these tubes in order to extract further heat from the gas just before it enters the inlets of the gas conducting channels 4a–4d.

Heat-exchanger 46 which, as described above, is between the common collection region at the outlet ends of all the gas conducting channels 4a–4d and the inlet to the impeller 41, extracts the bulk of the heat from the gas. It may use a low-cost cooling medium, such as tap water, for this purpose. The cooling tubes 108 and 110, carried by the fixed annular turning-vane assembly 100, extracts further heat from the gas just before the gas enters the inlet end of the gas-flow channels 4a–4d, in order to cool the gas to the temperature for optimum operation of the laser, and may use a more expensive cooling medium, such as chilled water.

While the invention has been described with respect to one preferred embodiment, including several variations, it will be appreciated that these are described purely for purposes of example, and that many other variations, modifications and applications of the invention may be made.

What is claimed is:

1. A high-power flowing-gas laser comprising: an outer housing having a sealed wall capable of withstanding an internal pressure different from atmosphere; a housing mounting for mounting the housing to a support; an optical system including a laser channel within said housing; an impeller within said housing for producing a flow of gas through said laser channel; and a motor drive for driving said impeller; characterized in that said laser further includes an independent mounting for mounting said optical system to said support independently of said housing mounting such as to isolate the optical system from the vibrational disturbances of said impeller and said motor drive; said independent mounting for the optical system including a plurality of legs each including a sealed lead-through leading the respective leg through the housing wall; said sealed lead-through for each leg comprising an elastomeric boot between the respective leg and said housing wall, the outer face of each boot being disposed within the interior of said housing and the latter being subject to a sub-atmospheric pressure, the inner face of each boot being disposed exteriorly of said housing and being subject to atmospheric pressure thereby preventing the boot from buckling.

2. The laser according to claim 1, wherein all said independent mounting legs are mounted at their lower ends on a common heavy base plate. boot between the respective leg and said housing wall, the outer face of each boot being disposed within the interior of said housing and the latter being subject to a subatmospheric pressure, the inner face of each boot being disposed exteriorly of said housing and being subjected to atmospheric pressure thereby preventing the boot from buckling.

3. The laser according to claim 1, wherein said housing mounting includes a plurality of legs each provided with a vibrational isolator.

4. The laser according to claim 1, wherein said drive motor is mounted to one end wall of said housing with the drive shaft of the motor disposed within the housing and coupled to the impeller within the housing.

5. The laser according to claim 4, wherein said drive motor is mounted to said one end wall of the housing by means of a mounting flange which is removable to provide an access opening into the interior of the housing.

6. The laser according to claim 5, wherein the opposite end wall of the housing is also removable to provide another access opening, opposite to that of the first-mentioned access opening, into the interior of the housing.

7. The laser according to claim 1, wherein said optical system includes at least one laser channel leg, and wherein said laser further includes a gas flow channel for each laser channel leg; each gas flow channel having an electrical discharging system for exciting the gas flowing therethrough, and aligned laser openings for the laser beam of the respective channel leg; and gas conduit means for conducting the gas flowing through each laser channel leg to flow transversely across said aligned laser openings thereof.

8. The laser according to claim 7, wherein said optical system includes a folded laser channel constituted of a plurality of legs disposed in a polygon configuration, there being one of said gas flow channels for each of said legs, said conduit means directing the gas to flow transversely across said legs from the outer region of the polygon radially inwardly to a common collection region within the polygon.

9. The laser according to claim 8, wherein said folded laser channel includes four legs disposed in a square configuration.

10. The laser according to claim 10, wherein each of said gas flow channels includes: an inlet section leading from the impeller and extending axially of the housing, a radially-extending outlet section formed at its inner end with said aligned openings for the laser beam, and baffles at the juncture of said two sections for directing the gas flow from the inlet section to the outlet section.

11. The laser according to claim 8, further including a heat-exchanger between said common collection region and said impeller for extracting heat from the gas leaving the common collection region before it enters the inlet end of the impeller.

12. The laser according to claim 11, further including a diffuser between the outlet end of said impeller and the inlet ends of said gas flow channels.

13. The laser according to claim 11, further including a fixed annular array of turning vanes between the outlet end of said impeller and the inlet ends of said gas flow channels, said fixed vanes being oriented to turn the gas flow from an azimuthal direction as it leaves the impeller to an axial direction as it enters the inlet ends of the gas flow channels.

14. The laser according to claim 13, wherein said fixed annular array of turning vanes includes a further heat-exchanger for extracting additional heat from the gas before it enters said gas flow channels.

15. A high-power flowing-gas laser comprising: an outer housing having a sealed wall capable of withstanding an internal pressure different from atmsphere and including a mounting for mounting the housing to a support: an optical system including a folded laser channel constituted of a plurality of legs disposed in a polygon configuration; an impeller for producing a flow of gas through said folded laser channels; a motor drive for driving said impeller; conduit means for conducting the gas to flow subtantially transversely across said laser channel legs radially inwardly from the outer region of the polygon to a common collection region within the polygon; said conduit means comprising a gas flow channel for each laser channel leg; each of said gas flow channels including an outer axially-extending section and an inner radially-extending section formed at its inner end with a pair of alligned laser openings for accomodating the laser beam of the respective laser channel leg; an electrical discharge system for exciting the gas flowing through said gas flow channels; a heat-exchanger between said common collection region and said impeller for extracting heat from the gas leaving the common collection region before it enters the inlet end of the impeller; and a fixed annular array of turning vanes between the outlet end of said impeller and the inlet ends of said gas channels, said latter vanes being oriented to turn the gas flow from a radial direction as it leaves the impeller to an axial direction as it enters the inlet ends of the gas flow channels.

16. The laser according to claim 15, wherein said fixed annular array of turning vanes includes a further heat-exchanger for extracting additional heat from the gas before it enters said gas-flow channels.

17. The laser according to claim 15, further including a diffuser between the outlet end of said impeller and said fixed annular array of turning vanes.

18. The laser according to claim 15, further including an independent mounting for mounting said optical system to said support independently of said housing mounting such as to isolate the optical system from the vibrational disturbances of said impeller and motor drive.

19. The laser according to claim 18, wherein said housing includes a sealed lead-through leading said independent mounting of the optical system through the housing wall in a sealed manner.

20. The laser according to claim 19, wherein said independent mounting for the optical system includes a plurality of legs each including a sealed lead-through leading the respective leg through the housing wall.

* * * * *